United States Patent
Suteerawanit (10) Patent No.: US 11,464,174 B1
(45) Date of Patent: Oct. 11, 2022

(54) DISASSEMBLABLE PLANTER BOX

(71) Applicant: Nick Suteerawanit, Los Angeles, CA (US)

(72) Inventor: Nick Suteerawanit, Los Angeles, CA (US)

(*) Notice: Subject to any disclaimer, the term of this patent is extended or adjusted under 35 U.S.C. 154(b) by 0 days.

(21) Appl. No.: 17/538,957

(22) Filed: Nov. 30, 2021

(51) Int. Cl.
*A01G 9/02* (2018.01)
*F16B 5/00* (2006.01)

(52) U.S. Cl.
CPC .............. *A01G 9/02* (2013.01); *F16B 5/0012* (2013.01)

(58) Field of Classification Search
CPC ......... A01G 9/02; F16B 5/0012; B65D 19/06; B65D 25/24
See application file for complete search history.

(56) References Cited

U.S. PATENT DOCUMENTS

| | | | | |
|---|---|---|---|---|
| 1,031,713 | A | * | 7/1912 | Hills ...................... A01G 9/026 47/73 |
| 1,146,219 | A | | 7/1915 | Way |
| 1,219,786 | A | * | 3/1917 | Splatter .................. B65D 19/06 52/266 |
| 1,500,917 | A | | 3/1923 | Bell |
| 1,776,375 | A | * | 9/1930 | Russell ..................... A01G 9/02 47/73 |
| 1,858,902 | A | | 12/1930 | Prantl |
| 1,942,975 | A | | 1/1933 | Polgar |
| 1,932,748 | A | * | 10/1933 | Peck ......................... A01G 9/02 47/66.1 |
| 2,219,690 | A | | 6/1939 | Leydecker |
| 2,656,969 | A | | 7/1950 | Kvasnok |
| 2,792,142 | A | | 11/1953 | Sandkuhle |
| 2,881,939 | A | | 7/1956 | Nelson |
| 3,047,183 | A | | 7/1962 | Papa |
| 3,076,289 | A | | 2/1963 | Gallo |
| 3,164,281 | A | | 6/1965 | Williams |
| 3,262,665 | A | | 7/1966 | Black |
| 3,951,294 | A | | 4/1976 | Wilson |
| 3,955,320 | A | | 5/1976 | Serovy |
| 4,019,279 | A | | 4/1977 | Moorman |

(Continued)

FOREIGN PATENT DOCUMENTS

| | | | | |
|---|---|---|---|---|
| DE | 202005019486 U1 | * | 3/2006 | ............ A01G 9/02 |
| EP | 1704770 B1 | * | 4/2009 | ............ A01G 9/023 |
| KR | 20080107764 A | * | 12/2008 | ............ A01G 17/14 |

*Primary Examiner* — Ebony E Evans
(74) *Attorney, Agent, or Firm* — Averill & Green; Kenneth L. Green (57) ABSTRACT

An assemblable and disassemblable planter box for propagation, growing, transporting, and planting. The planter box has two sides and a bottom saucer. The sides are attached by engaging assembly a tongue along one edge with a groove formed by side by side lips along a corresponding edge, and inserting locks through the tongue and lips. The bottom saucer attaches the assembled sides to complete the planter box. The bottom saucer may be attached to the sides by bottom saucer locks inserted through bottom saucer slots and into side bottoms. Slots near side tops may receive horizontal planks and diagonal rods reaching up from corner tops help stabilize trees in the planter box. The bottom saucer may includes fork lift passages to facilitate movement of large planter boxes. The sides and bottom saucer may be made from High Density PolyEthylene (HDPE) or from PolyPropylene (PP), both recyclable materials.

14 Claims, 10 Drawing Sheets

(56) References Cited

U.S. PATENT DOCUMENTS

| | | | |
|---|---|---|---|
| 4,031,663 A | 6/1977 | Burnk | |
| 4,031,832 A | 6/1977 | Edwards | |
| 4,074,461 A * | 2/1978 | Hirschman | A01G 9/124 248/165 |
| 4,216,622 A * | 8/1980 | Hollenbach | A01G 2/20 47/73 |
| 4,363,189 A | 12/1982 | O'Donnell | |
| 4,497,132 A | 2/1985 | Whitcomb | |
| 4,612,726 A | 9/1986 | Mori | |
| 4,665,645 A | 5/1987 | Schau | |
| 4,716,680 A | 1/1988 | Whitcomb | |
| 4,796,383 A | 1/1989 | Inoue | |
| 4,809,851 A | 3/1989 | Oestreich | |
| 4,850,136 A | 7/1989 | Vollers | |
| 4,901,473 A | 2/1990 | Taule | |
| 5,157,869 A * | 10/1992 | Minton | A01G 9/02 47/75 |
| 5,236,099 A | 8/1993 | Fties | |
| 5,241,784 A | 9/1993 | Henry | |
| 5,383,302 A | 1/1995 | Hill | |
| 5,597,084 A * | 1/1997 | Parasin | B65D 19/18 220/4.28 |
| 5,704,508 A | 1/1998 | Kelp | |
| 5,870,856 A * | 2/1999 | Friend | A47G 7/047 47/72 |
| 5,878,528 A * | 3/1999 | Pattyn | A01G 13/0281 47/32 |
| 5,953,858 A | 9/1999 | Loosen | |
| 9,668,428 B1 * | 6/2017 | Frame | A01G 9/02 |
| 2003/0213175 A1 * | 11/2003 | Rhindress | A01G 9/029 47/73 |
| 2005/0271852 A1 * | 12/2005 | Solomon | E04F 15/02172 428/58 |
| 2013/0042528 A1 * | 2/2013 | Nason | A01G 13/0281 47/85 |
| 2015/0291271 A1 * | 10/2015 | Benner | F16B 5/02 403/376 |
| 2016/0050855 A1 | 2/2016 | Munt, III | |
| 2017/0055459 A1 * | 3/2017 | Takaoka | A01G 9/042 |

\* cited by examiner

DISASSEMBLABLE PLANTER BOX

BACKGROUND OF THE INVENTION

The present invention relates to nursery pots and in particular to a simple disassemblable planter box.

Growers, landscapers, gardeners, and home owners frequently grow and propagate plants. Growing plants often requires initial growing in a planter box or transplanting into a larger planter box as the plants grow, and later transplanting into a still larger planter box for sale. Some plant prolongation requires temporary locating a clipping in a planter box in a shaded area until roots are established. Large plants require very large planter boxes and it can be difficult to separate the plant from the planter box without damaging the plant.

The growers, landscapers, gardeners, and home owners often desire to store and/or reuse planter boxes, but such storage may require substantial space and be unsightly.

Disassemblable planter boxes have been developed to solve the disassembly and storage issues, but known disassemblable planter boxes can be expensive and awkward to assemble, and the features used to assemble the planter box can be damaged and difficult to use. Known a disassemblable planter box is made from wood and is susceptible to insect and weather damage. A need thus remains for an inexpensive, reusable, and easy to assemblable planter boxes that are durable.

BRIEF SUMMARY OF THE INVENTION

The present invention addresses the above and other needs by providing an assemblable and disassemblable planter box having two sides and a bottom saucer for propagation, growing, transporting, and planting. The sides are attached using side locks inserted through slots in the sides. The bottom saucer attaches the assembled sides to complete the planter box. The bottom saucer may be attached to the sides by bottom saucer locks inserted through bottom saucer slots and into side bottoms. Slots near side tops may receive horizontal planks and diagonal trunk supports reaching up from top corners help stabilize trees in the planter box. The bottom saucer may include fork lift passages to facilitate movement of large planter boxes. The sides and bottom saucer may be made from High Density PolyEthylene (HDPE) or from PolyPropylene (PP), both recyclable materials.

In accordance with one aspect of the invention, there is provided a planter box which can be easily disassembled. The planter box preferably includes a top portion comprising two sides having overlapping edges receiving locks to attach the sides. Once the locks are removed, the two sides easily separate releasing the plant.

In accordance with another aspect of the invention, there is provided a planter box having a bottom saucer separable from the top portion. The bottom saucer may be attached to the top portion by locks. The bottom saucer may also serve as a pallet and include fork lift passages facilitating moving large planer boxes, and may receive bottom saucer stabilizers to stabilize the planter box.

In accordance with yet another aspect of the invention, there is provided a planter box strengthen by horizontal ribs and vertical splines. The ribs and splines provide an exoskeleton for the planter box. The locks preferably are positioned to engage the ribs and/or spines.

In accordance with still another aspect of the invention, there is provided a planter box supporting large trees. The side may include slots receiving horizontal planks and diagonal trunk supports reach up to stabilize trees held in the planter box.

In accordance with yet another aspect of the invention, there are provided bottom stabilizers for the planter box. The bottom stabilizers are flat plates that insert into passaged in the bottom saucer and prevent or reduce the chance of the planter box tipping over in a strong wind.

In accordance with still another aspect of the invention, there is provided a planter box supporting large trees. The side may include slots receiving horizontal planks made of High Density Polyethylene (HDPE), a recyclable plastic.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Generally vertical referrers to a slant dimension corresponding to a slope of sides of a tapered planter box, and has some horizontal component.

Figure 1A:
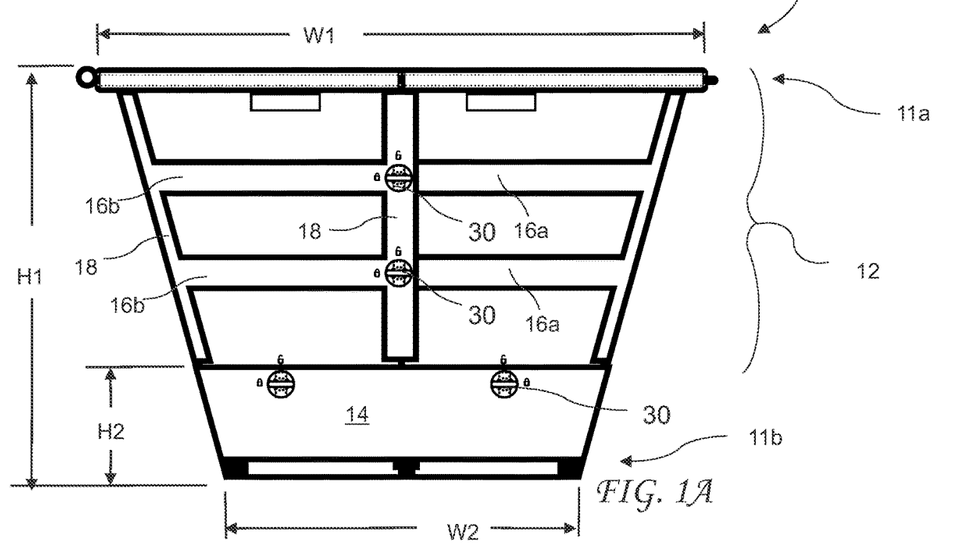
FIG. 1A shows a front view of a disassemblable planter box according to the present invention.
Figure 1B:
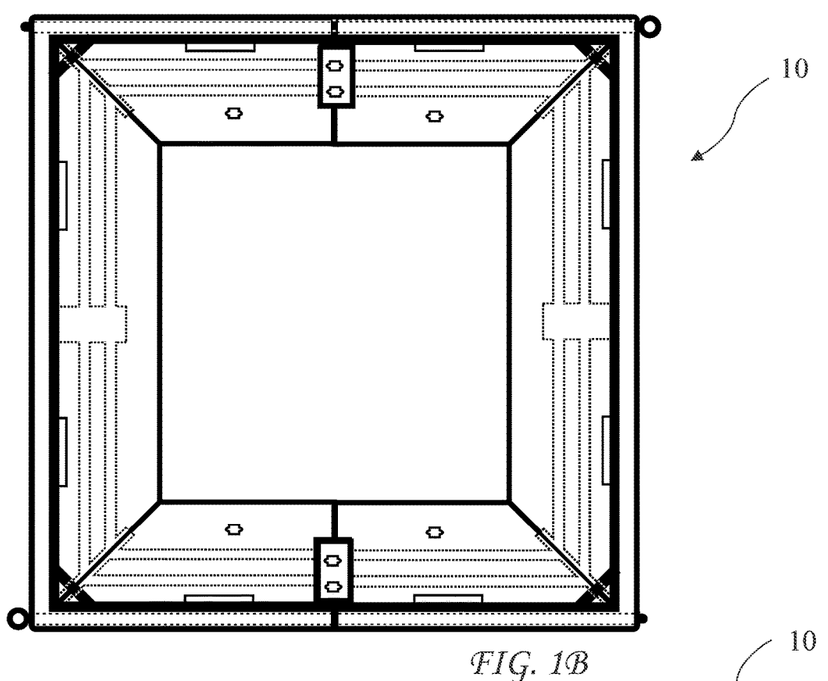
FIG. 1B a top view of the disassemblable planter box according to the present invention.

A front view of a disassemblable planter box 10 according to the present invention is shown in FIG. 1A and a top view of the disassemblable planter box 10 is shown in FIG. 1B. The planter box 10 includes a top portion 12 and bottom saucer 14. The top portion 12 includes ribs 16a and 16b connected to spines 18 providing strength. Locks 30 (see FIGS. 2A, 2B, and 7-8D) connect sides 12a and 12b (see FIG. 2A) together, and connect the bottom 14 to the top portion 12. The Locks 30 preferably engage the ribs 16 and/or splines 18. The planter box 10 is at least some amount tapered larger from a bottom 11b to a top 11a, to facilitate placing and removing plants from the planter box 10.

The ribs 16 and splines 18 for six foot by six foot planter box are preferably about six inches wide and two inches thick, for one foot by one foot planter box are preferably about one inch wide and one quarter inches thick, and for six inch by six inch planter box are preferably about one half inches wide and one eighth inches thick.

The planter box 10 has an overall height H1, top width W1 and a bottom width W2. The height H1 is preferably between 6 inches and 8 feet, the width W1 is preferably between 6 inches and 8 feet, and the width W2 is preferably between 4.5 inches and 6.5 feet. The bottom has a height H2. The height H2 is preferably between ⅕ and ⅓ of H1, and more preferably ¼ of H1.

Figure 2A:
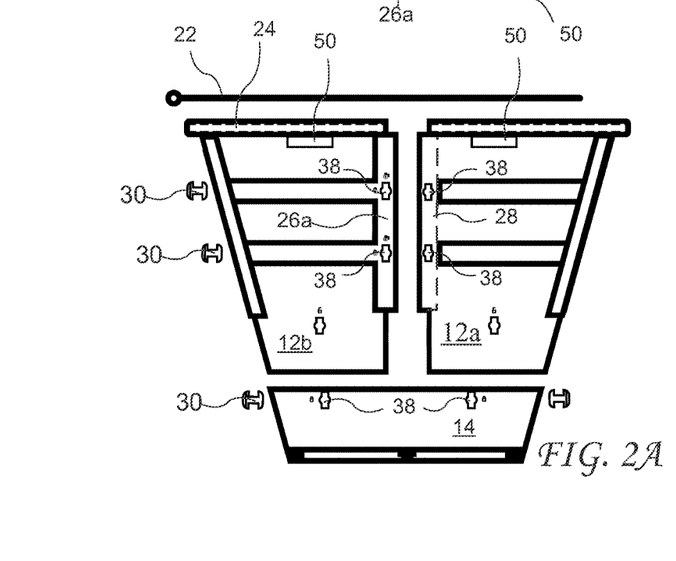
FIG. 2A shows a front view of a disassemblable planter box according to the present invention.
Figure 2B:
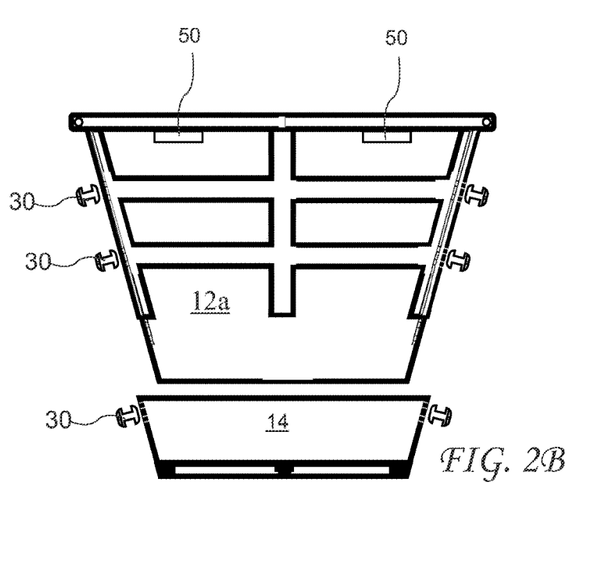
FIG. 2B shows a side view of the disassemblable planter box according to the present invention.
Figure 2C:
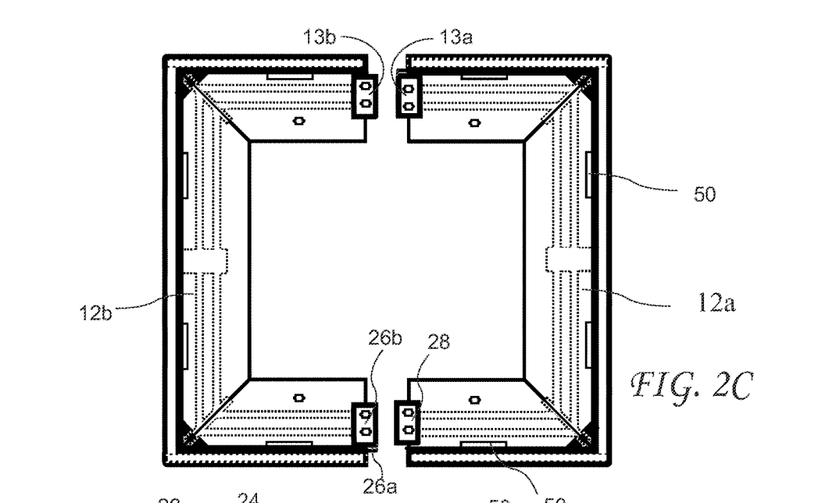
FIG. 2C shows a top view of sides of the disassemblable planter box according to the present invention.

A front view of a disassemblable planter box 10 is shown in FIG. 2A, a side view of the disassemblable planter box 10 rotated 90 degrees is shown in FIG. 2B, and a top view of sides of the disassemblable planter box 10 is shown in FIG. 2C. The planter box 10 is assembled from two sides 12a and 12b, which are preferably identical and include first edges 13a and second edges 13b. The sides 12a and 12b are attached using Locks 30 passing through lock passages 38. Rods 22 pass through rod passages 24 to help align the two sides 12a and 12b.

Figure 3:
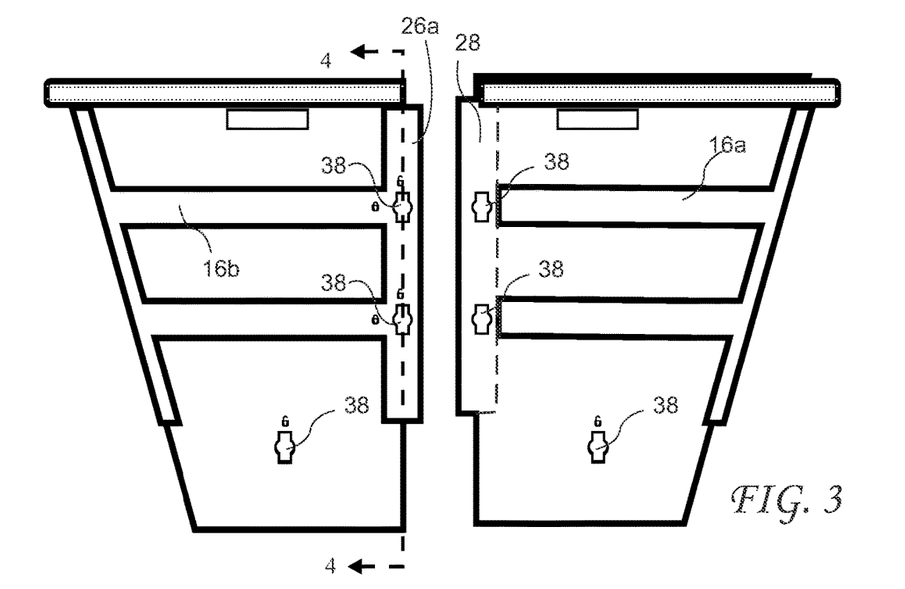
FIG. 3 shows a side view of the two sides of the planter box according to the present invention.
Figure 4:
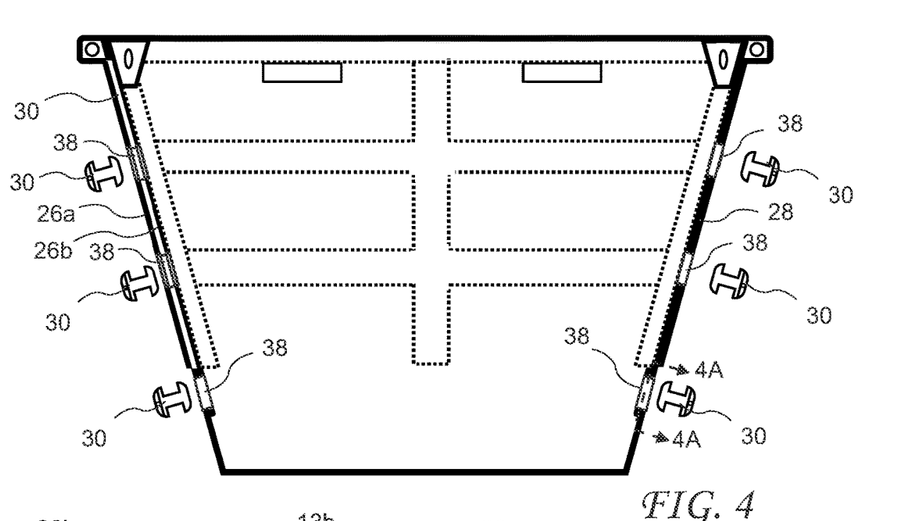
FIG. 4 shows a cross-sectional view of a side planter box according to the present invention taken along line 4-4 of FIG. 3.
Figure 4A:
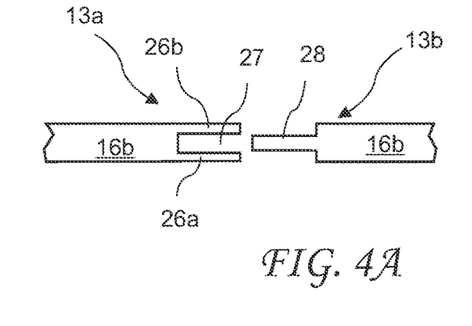
FIG. 4A shows a cross-sectional view of disengaged edges of the two sides of the planter box according to the present invention taken along line 4A-4A of FIG. 4.
Figure 4B:
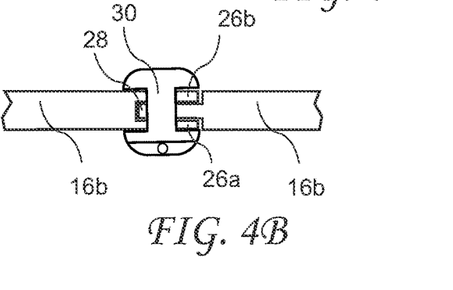
FIG. 4B shows a cross-sectional view of engagement and locking of the two sides of the planter box according to the present invention taken along line 4A-4A of FIG. 4.

FIG. 3 shows a side view of the two sides 16a and 16b of the planter box 10, FIG. 4 shows a cross-sectional view of a side planter box 10 taken along line 4-4 of FIG. 3, FIG. 4A shows a cross-sectional view of disengaged edges 13a and 13b (see FIG. 2C) of the two sides of the planter box taken along line 4A-4A of FIG. 4. and FIG. 4B shows a cross-sectional view of engagement and locking of the two sides of the planter box taken along line 4A-4A of FIG. 4. The first edge 13a of the sides 12a and 12b include an outer lip 26a and inner lip 26b forming a groove 27, and the second edge 13b includes a tongue 28 engaging the groove 27 when the planter box 10 is assembled. The locks 30 are inserted through lock passages 38 in the outer lip 26a, the tongue 18, and inner lip 26b to retain the sides 12a and 12b.

Figure 5A:
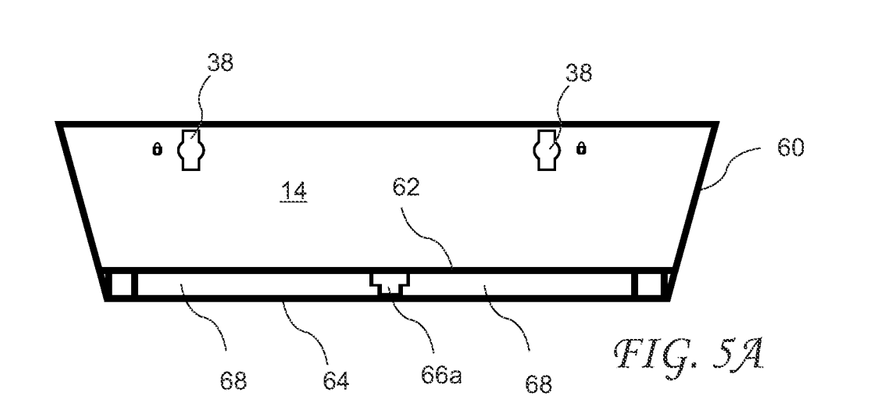
FIG. 5A shows a front view of a bottom saucer of the planter box according to the present invention.
Figure 5B:
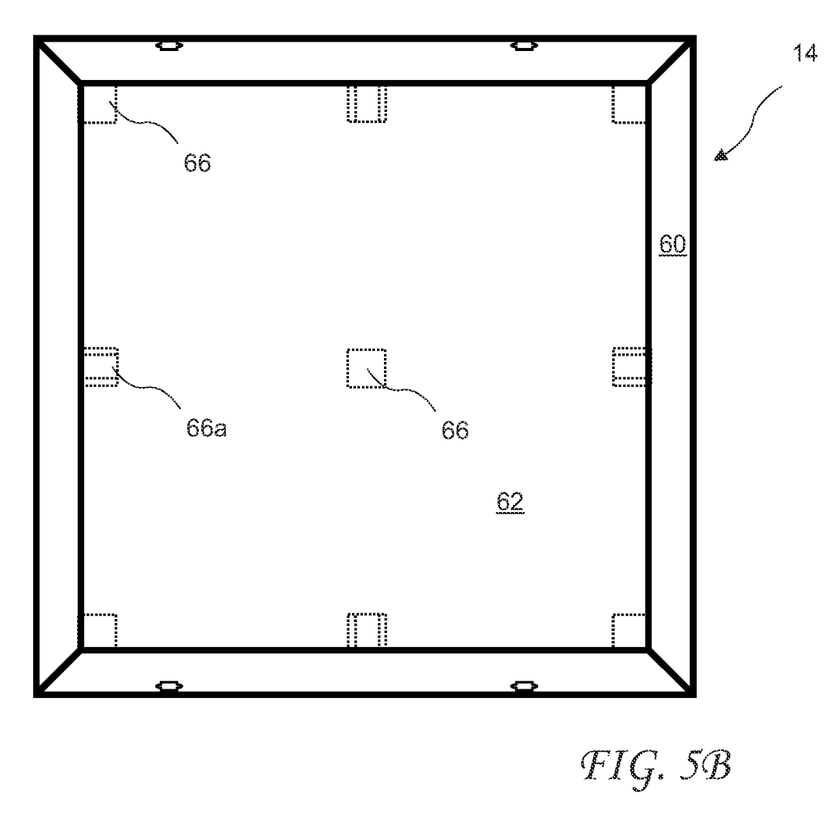
FIG. 5B shows a top view of the bottom saucer of the planter box according to the present invention.

FIG. 5A shows a front view of the bottom saucer 14 of the planter box 10 and FIG. 5B shows a top view of the bottom saucer 14. The bottom saucer 14 includes walls 60, preferably tapered to rest against the sides 12a and 12b of the planter box 10. A floor 62 is separated from a base (or bottom) 64 by posts 66 and 66a creating fork lift passages 68. The posts 66a may be stepped to improve engagement of stabilizers 52 (see FIG. 6) with the planter box 10.

Figure 6:
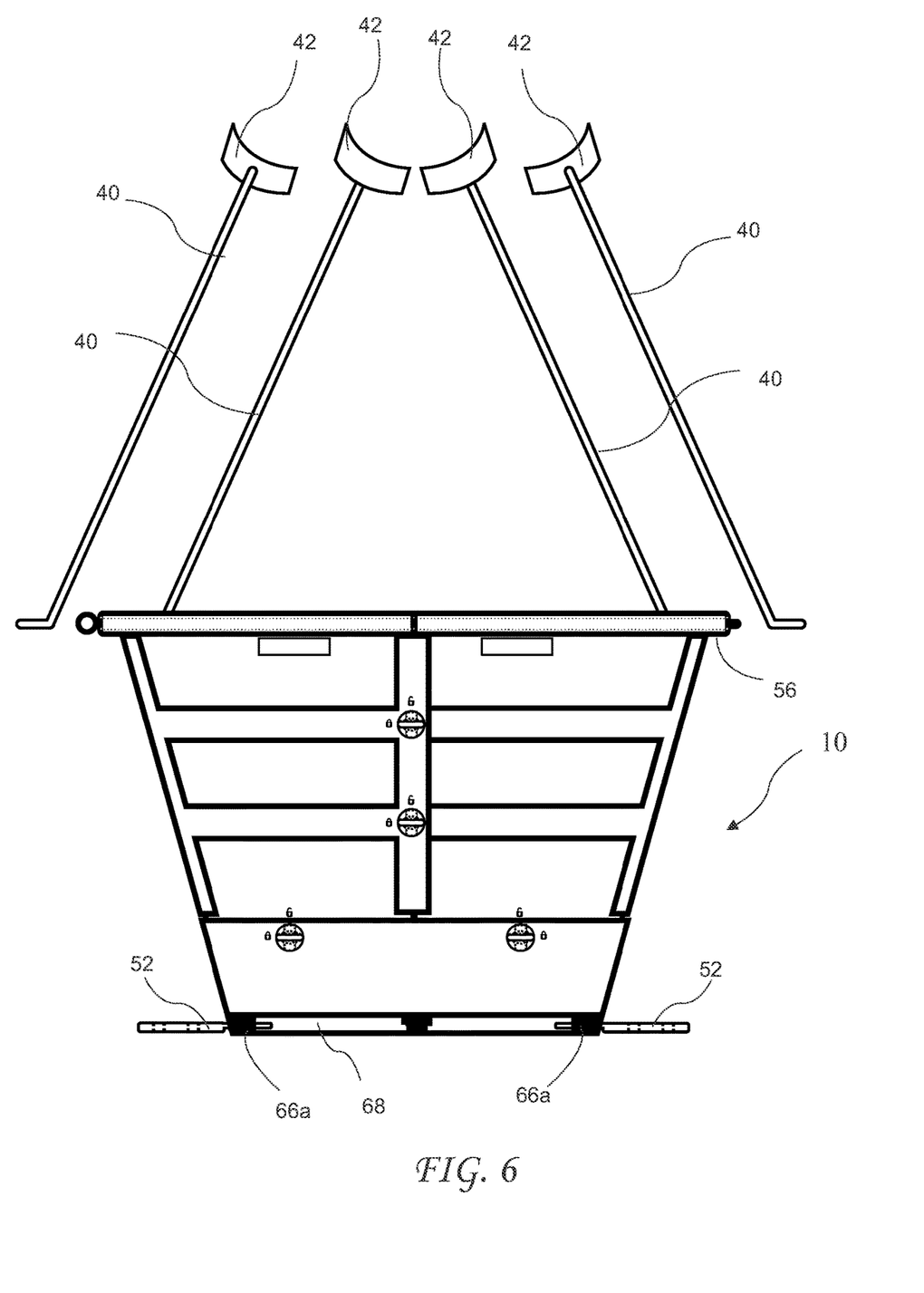
FIG. 6 shows a side view of the planter box including bottom saucer stabilizers and diagonal trunk supports according to the present invention.

FIG. 6 shows a side view of the planter box 10 including bottom saucer stabilizers 52 and diagonal trunk supports 40. The diagonal trunk supports 40 engage the planter box 10 and help hold a tree trunk erect. The stabilizers 52 may be inserted into the bottom saucer 14 into the fork lift passage 68 between the floor and 62 and base 64, and may engage one of the posts 66.

Figure 7:
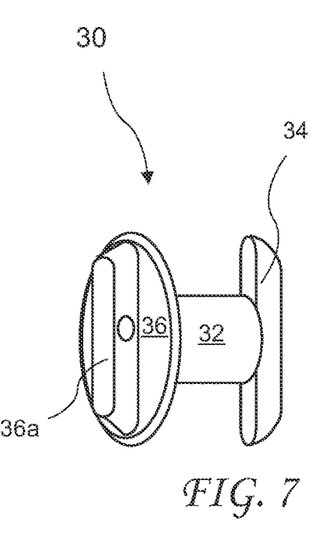
FIG. 7 shows a perspective view of a lock for the disassemblable planter box according to the present invention.
Figure 8A:
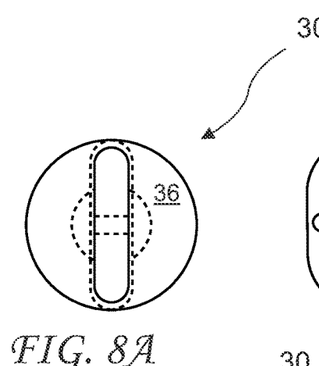
FIG. 8A shows a first end view of a lock for the disassemblable planter box according to the present invention.
Figure 8B:
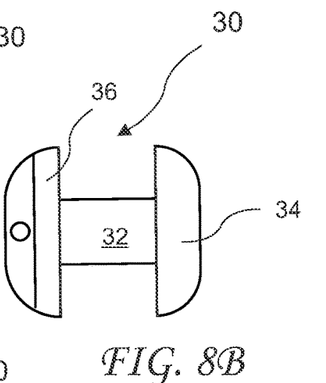
FIG. 8B shows a first side view of a lock for the disassemblable planter box according to the present invention.
Figure 8C:
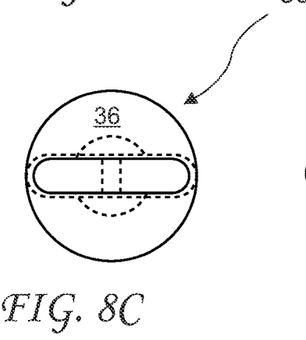
FIG. 8C shows a second end view of a lock for the disassemblable planter box according to the present invention.
Figure 8D:
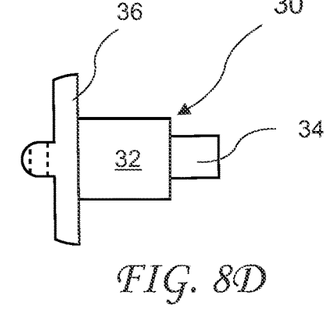
FIG. 8D shows a second side view of a lock for the disassemblable planter box according to the present invention.

FIG. 7 shows a perspective view of the lock 30, FIG. 8A shows a first end view of the lock 30, FIG. 8B shows a first side view of the lock 30, FIG. 8C shows a second end view of the lock 30, and FIG. 8D shows a second side view of the lock 30. The lock 30 includes a head 34 inserted through the lock passages 38 (see FIGS. 3-5A) and rotated to lock into place. A handle 36 is connected to the head 34 by a neck 32. The handle 36 includes an elongated portion 36a aligned with the head 34 for turning the lock 30 and indicating the engagement of the head 34 with the sides 12a and 12b (see FIG. 2A and 2C) of the planter box 10, reaching past the lock passage 38 (see FIG. 4B).

Figure 9A:
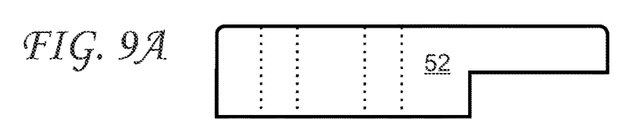
FIG. 9A shows a side view of a bottom saucer stabilizer according to the present invention.
Figure 9B:
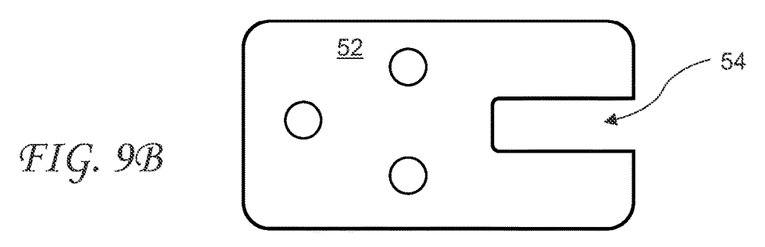
FIG. 9B shows a top view of the bottom saucer stabilizer according to the present invention.

FIG. 9A shows a side view of a bottom saucer stabilizer 52 and FIG. 9B shows a top view of the bottom saucer stabilizer 52. The bottom saucer stabilizer 52 is inserted into the fork lift passage 68 and preferably includes a mouth 54 which may straddle one of the posts 66 in the bottom of the bottom saucer 14.

Figure 10:
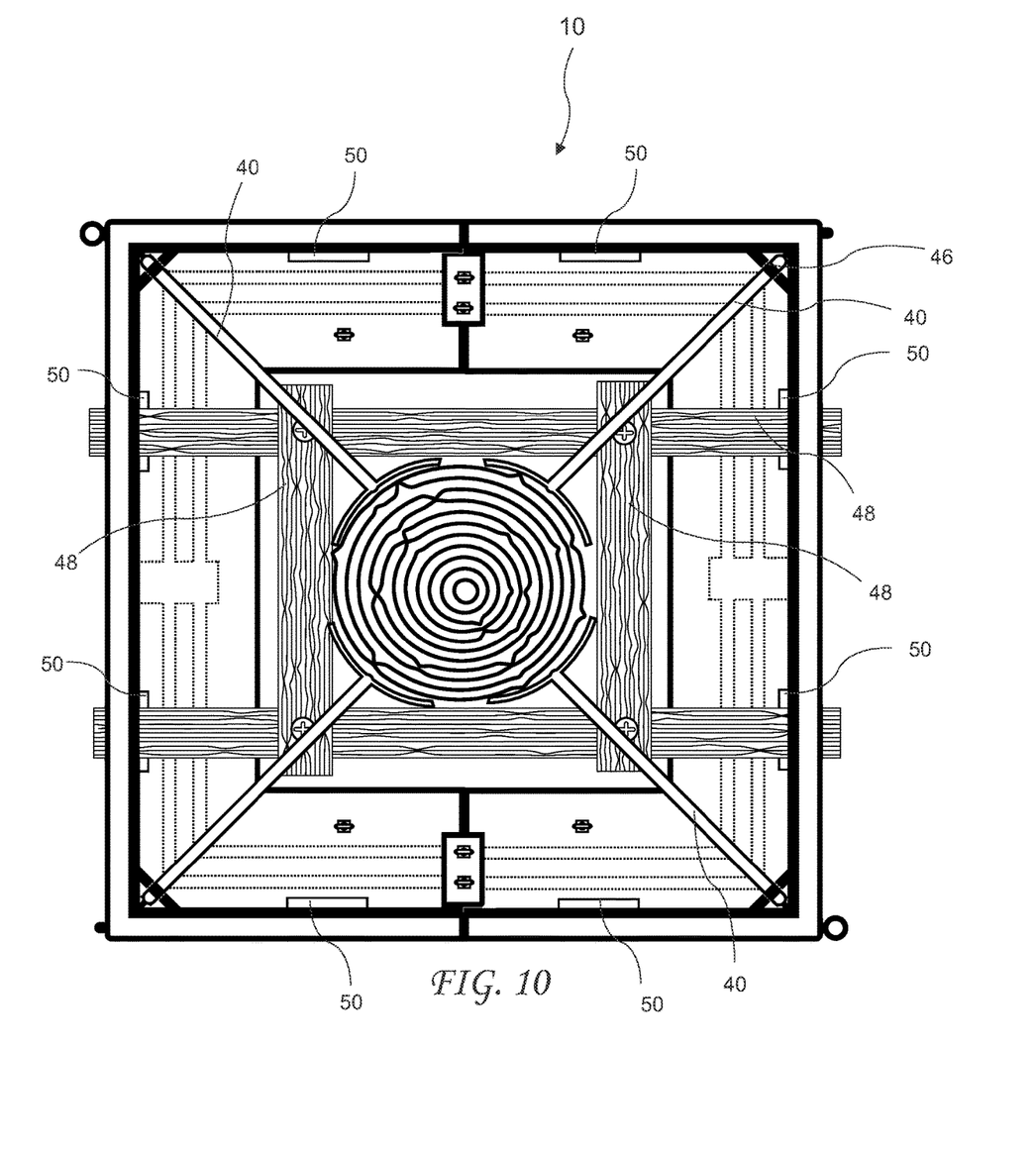
FIG. 10 shows a top view of the planter box including horizontal planks and diagonal trunk supports according to the present invention.

FIG. 10 shows a top view of the planter box 10 including horizontal planks 48 passing through slots 50 serving as trunk base stabilizers and diagonal trunk supports 40. The diagonal trunk supports 40 include cupped tops 42 (see FIG. 6) which are pressed against a tree 80 trunk, and bottoms engaging trunk support holders 46 in the planter box 10, preferably is top corners of the planter box 10.

Figure 11:
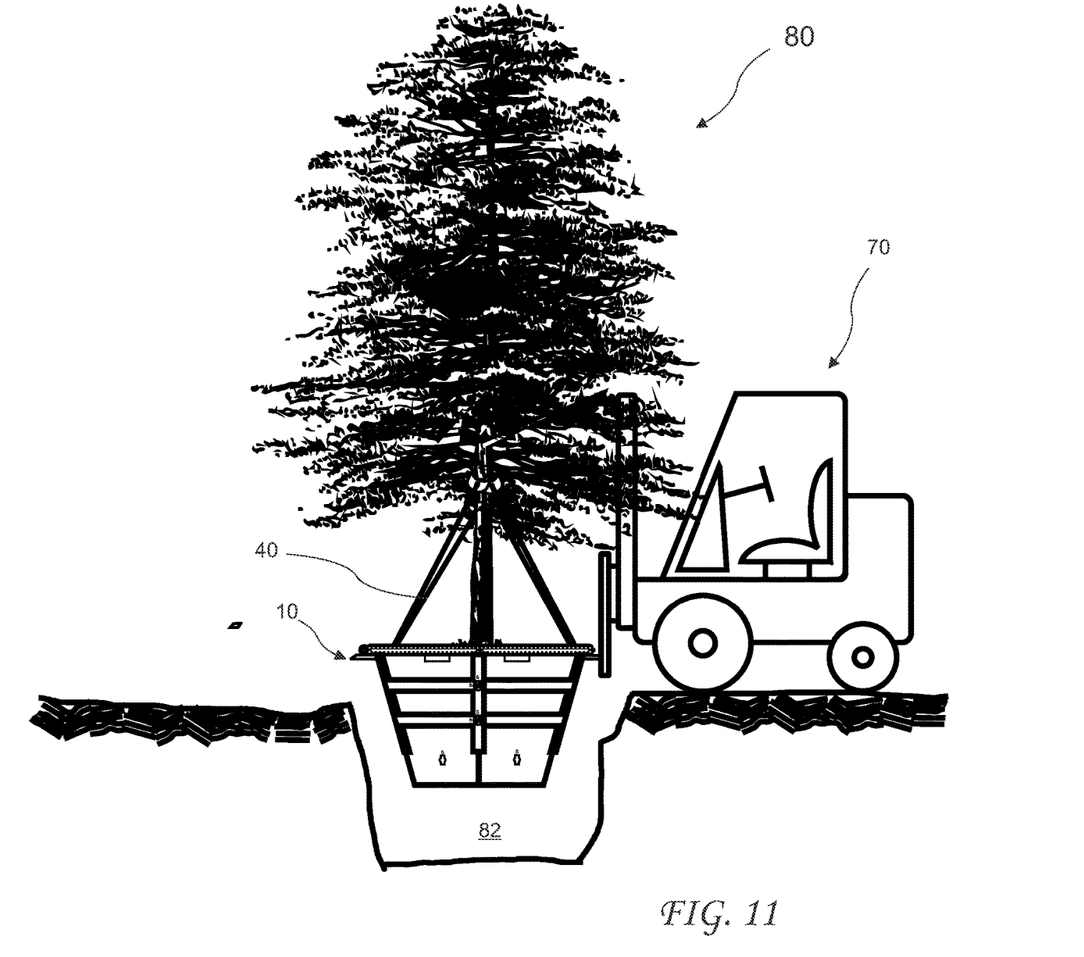
FIG. 11 shows a forklift carrying the planter box containing a tree preparing to plant according to the present invention.
Figure 11A:
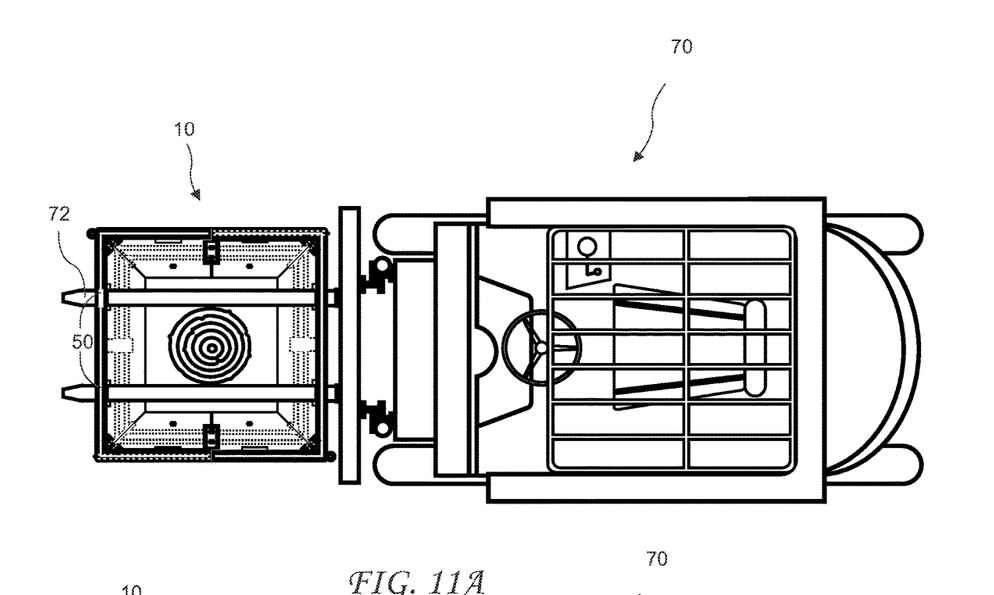
FIG. 11A shows forklift forks engaging passages in the planter box containing a tree preparing to plant according to the present invention.
Figure 11B:
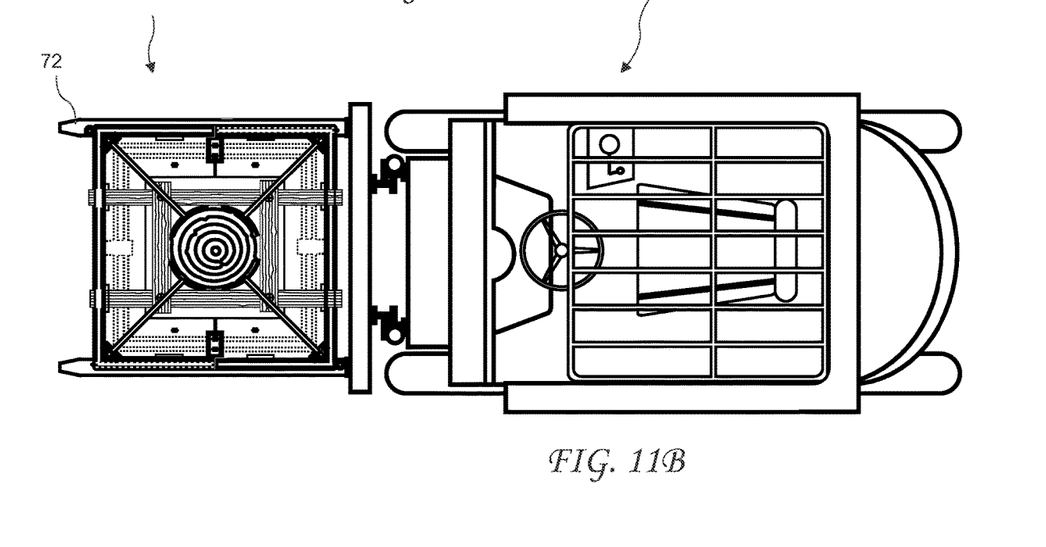
FIG. 11B shows the forklift forks supporting top edges of the planter box containing a tree preparing to plant according to the present invention.

FIG. 11 shows a forklift 70 carrying the planter box 10 containing a tree 80 preparing to plant the tree 80 in a hole 82, FIG. 11A shows forklift forks 72 engaging the support slots 50 (see FIG. 2A-2C) in the planter box 10, and FIG. 11B shows the forklift forks 72 supporting top edges 56 (see FIG. 6) of the planter box 10.

Figure 12:
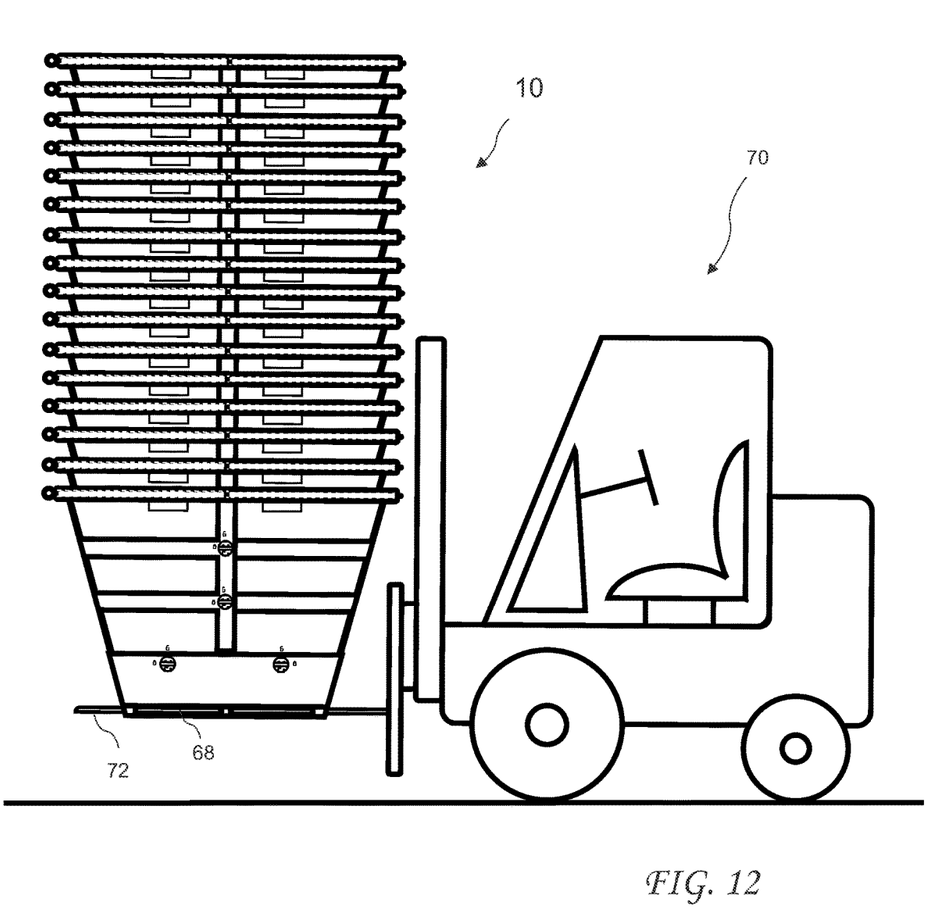
FIG. 12 shows a number of stacked planter boxes carried by a forklift according to the present invention.

FIG. 12 shows a number of stacked planter boxes 10 carried by the forklift 70.

While the invention herein disclosed has been described by means of specific embodiments and applications thereof, numerous modifications and variations could be made thereto by those skilled in the art without departing from the scope of the invention set forth in the claims.

I claim:

1. A disassemblable planter box comprising:
   two sides;
   two side by side body assembly lips reaching from a first edge of each side, the two assembly lips forming a groove; and
   a tongue proximal to a second edge of each side opposite to the first edge, the tongue insertable into the groove to join the two sides; and
   a bottom saucer attachable under the two sides after assembling the two sides, wherein:
   the bottom saucer includes fork lift passages;
   the fork lift passages are configured to accept fork lift forks to lift and relocate the planter box;
   bottom saucer stabilizers configured to engage the fork lift passages in the bottom saucer to stabilize the planter box;
   the bottom saucer includes a floor and a base under the floor, the floor separated from the base by posts;
   the fork lift passage reside between the floor and the base; and
   the bottom saucer stabilizers include mouths engaging the posts.

2. The disassemblable planter box of claim 1, wherein the two sides of an assembled disassemblable planter box combine define a tapered shape having a top larger than a bottom.

3. The disassemblable planter box of claim 1, wherein:
   the tongue reaches laterally past an adjacent body edge and into a corresponding one of the grooves;
   the tongue and the body assembly lips include lock passages aligned when the sides are assembled; and
   locks are insertable through the lock passages to retain the assembled two sides.

4. The disassemblable planter box of claim 3, wherein:
   heads of the locks reside inside a corresponding one of the two bodies; and
   handles of the bottom saucer locks reside outside the two bodies.

5. The disassemblable planter box of claim 4, wherein:
   the locks include cylindrical necks between the handles and the heads;
   the heads include laterally extending head portions; and
   the handles include extending handle portions facilitating turning the locks to engage the engage the locks with the two sides.

6. The disassemblable planter box of claim 1, wherein:
   the two sides include bottom lock passages;
   the bottom sauce includes bottom saucer lock passages aligned with the bottom lock passages when the bottom saucer is attached to the bodies; and
   bottom saucer locks are insertable through bottom lock passages and the aligned bottom saucer passages to retain the bottom saucer to the assembled two sides.

7. The disassemblable planter box of claim 6, wherein:
   heads of the bottom saucer locks reside inside a corresponding one of the two bodies; and
   handles of the bottom saucer locks reside outside the bottom saucer.

8. The disassemblable planter box of claim 1, wherein:
   the posts include stepped posts centered on each side of the bottom saucer, the stepped posts having narrow post bases; and
   the bottom saucer stabilizer include mouths engaging the narrow posts bases.

9. The disassemblable planter box of claim 1, wherein the planter box includes a top edge configured to rest on fork lift forks to lift and relocate the planter box.

10. The disassemblable planter box of claim 1, further including diagonal trunk supports attached to the planter box and reaching upward and inward to bear against a tree to hold the tree erect.

11. The disassemblable planter box of claim 1, further including:
    support slots proximal to a top of the planter box; and
    support planks engageable with the support slots to limit horizontal movement of a tree in the planter box.

12. A disassemblable planter box comprising:
    two sides;
    two side by side body assembly lips reaching laterally from a first edge of each side;
    a groove between the two side by side body assembly lips;
    a tongue reaching laterally from a second edge of each of the two sides opposite to the first edge, the tongue insertable into the groove to join the two sides; and
    a bottom saucer attachable under the two sides after joining the two sides;
    a floor of the bottom saucer;
    a base of the bottom saucer under the floor;
    passages between the base and the floor;
    bottom saucer stabilizers insertable into the passages while reaching outside the bottom saucer, stabilizing the planter box;
    posts separating the floor from the base; and
    the bottom saucer stabilizers include mouths engaging the posts, wherein:
    the posts comprise side and corner posts;
    the side posts are stepped having a narrow bottom portion; and
    the saucer stabilizers engage the narrow bottom portions of the side posts to improve engagement of the saucer stabilizers and side posts.

13. The disassemblable planter box of claim 12, wherein:
    the passages comprise fork lift passages residing between the floor and the base; and
    the forklift passages are configured to receive fork lift forks to lift and relocate the planter box.

14. A disassemblable planter box comprising:
    two sides;
    two side by side body assembly lips reaching laterally from a first edge of each side;
    a groove between the two side by side body assembly lips;
    a tongue reaching laterally from a second edge of each side opposite to the first edge, the tongue insertable into the groove to join the two sides;
    lock passages through the tongue and both of the body assembly lips, the lock passages aligned when the sides are assembled; and
    locks insertable horizontally and simultaneously through the lock passages in the tongue and through corresponding ones of the lock passages in both of body assembly lips, to retain the assembled two sides, wherein:
    the lock passages through the tongue and both of body assembly lips have a first dimension and a second dimension perpendicular to the first dimension, the second dimension shorter than the first dimension;
    the locks include a head insertable simultaneously through the tongue and both of body assembly lips only when the head is alignable with the first dimension; and the lock is retained through the tongue and both of body assembly lips when the lock is rotated to miss align the head with the first dimension.

\* \* \* \* \*